United States Patent
Gaumnitz et al.

(10) Patent No.: US 10,055,480 B2
(45) Date of Patent: Aug. 21, 2018

(54) AGGREGATING DATABASE ENTRIES BY HASHING

(71) Applicant: SAP SE, Walldorf (DE)

(72) Inventors: Gordon Gaumnitz, Walldorf (DE); Arnaud Lacurie, Walldorf (DE); Ingo Mueller, Walldorf (DE); Jonathan Dees, Karlsruhe (DE)

(73) Assignee: SAP SE, Walldorf (DE)

( * ) Notice: Subject to any disclaimer, the term of this patent is extended or adjusted under 35 U.S.C. 154(b) by 574 days.

(21) Appl. No.: 14/726,251

(22) Filed: May 29, 2015

(65) Prior Publication Data

US 2016/0350394 A1 Dec. 1, 2016

(51) Int. Cl.
*G06F 17/30* (2006.01)

(52) U.S. Cl.
CPC .... *G06F 17/30598* (2013.01); *G06F 17/3033* (2013.01); *G06F 17/30339* (2013.01); *G06F 17/30377* (2013.01); *G06F 17/30442* (2013.01); *G06F 17/30489* (2013.01); *G06F 17/30584* (2013.01)

(58) Field of Classification Search
CPC .......... G06F 17/30327; G06F 9/4881; G06F 17/30598; G06F 17/3033; G06F 17/30339; G06F 17/30377; G06F 17/30442; G06F 17/30489; G06F 17/30584; H04L 67/1097; H03M 7/3084
USPC ........................................................ 707/740
See application file for complete search history.

(56) References Cited

U.S. PATENT DOCUMENTS

| | | | | |
|---|---|---|---|---|
| 2006/0116989 | A1* | 6/2006 | Bellamkonda | .... G06F 17/30489 |
| 2011/0225168 | A1* | 9/2011 | Burroughs | ............ G06F 9/3851 |
| | | | | 707/747 |
| 2012/0011144 | A1* | 1/2012 | Transier | ............. G06F 17/3033 |
| | | | | 707/769 |
| 2014/0188906 | A1 | 7/2014 | Muller et al. | |

(Continued)

OTHER PUBLICATIONS

Muller, Ingo, et al. "Cache-Efficient Aggregation: Hashing is Sorting." *Proceedings of the 2015 ACM SIGMOD International Conference on Management of Data*, Published on May 27, 2015: 1123-136.

(Continued)

*Primary Examiner* — James Trujillo
*Assistant Examiner* — Jessica N Le
(74) *Attorney, Agent, or Firm* — Mintz Levin Cohn Ferris Glovsky and Popeo, P.C.

(57) ABSTRACT

Aggregating input into hashtables using just-in-time compilation of compilable code in response to a database query. Compilable code can be generated that is configured to cause a programmable processor to produce one or more hashmaps based on the input database. The one or more hashmaps can correspond to each individual thread from the input. The compilable code can be configured to cause the one or more processors to insert the hashmaps into a scheduler. Compilable code can be generated that is configured to: aggregate elements from the one or more hashmaps into buckets of elements having the same partition identity; rehash the buckets of elements having the same partition identity to reduce the number of groups within the bucket; facilitate the merger of all non-empty elements from each target-partition into a merged-partition.

20 Claims, 9 Drawing Sheets

(56) References Cited

U.S. PATENT DOCUMENTS

| | | | |
|---|---|---|---|
| 2014/0222776 A1* | 8/2014 | Zhu ................... | G06F 17/30864 707/709 |
| 2014/0351239 A1* | 11/2014 | Davis ................ | G06F 17/30483 707/718 |
| 2015/0120652 A1* | 4/2015 | Dittrich ............. | G06F 17/30575 707/610 |
| 2015/0248476 A1* | 9/2015 | Weissinger ....... | G06F 17/30516 707/737 |

OTHER PUBLICATIONS

ACM Digital Library: "Bibliography: Cache-Efficient Aggregation: Hashing is Sorting." May 27, 2015. * *Cited to establish the publication date of the proceedings of the ACM SIGMOD conference* *; Retrieved from the Internet: URL:http://dl.acm.org/citation.cfm?id=2747 644# [retrieved on Oct. 12, 2016].

Sompolski, Justin. *Just-in-Time Compilation in Vectorized Query Execution*. Thesis. University of Warsaw, 2011. 1-87.

* cited by examiner

Algorithm 1 Algorithmic Building Blocks

1: func PARTITIONING(run: Seq. of Row, level)
2:   for each row in run do
3:     $R_h \leftarrow R_h \cup$ row with $h = \text{HASH}(\text{row.key}, \text{level})$
4:   return $(R_1, \ldots, R_F)$
5: func HASHING(run: Seq. of Row, level)
6:   for each row in run do
7:     table.INSERTORAGGREGATE(row.key, row, level)
8:     if table.ISFULL() then
9:       tables $\leftarrow$ tables $\cup$ table ; table.RESET(())
10:  return $(R_1, \ldots, R_F)$ with $R_i \leftarrow \bigcup_{t \in \text{tables}} \text{GETRANGE}(t, i)$

FIG. 8

Algorithm 2 Aggregation Framework

1: AGGREGATE(SPLITINTORUNS(input), 0)   ▷ initial call
2: func AGGREGATE(input: Seq. of Seq. of Row, level)
3:   if $|\text{input}| == 1$ and ISAGGREGATED(input[0]) then
4:     return input[0]
5:   for each run at index $j$ in input do
6:     PRODUCERUNS $\leftarrow$ HASHINGORPARTITIONING()
7:     $R_{j,1}, \ldots, R_{j,F} \leftarrow$ PRODUCERUNS(run, level)
8:   return $\bigcup_{i=1}^{F}$ AGGREGATE($\bigcup_j R_{j,i}$, level + 1)

FIG. 9

AGGREGATING DATABASE ENTRIES BY HASHING

TECHNICAL FIELD

The subject matter described herein relates to aggregation of data using a hash table for a database query of a database system.

BACKGROUND

Large databases rely heavily on grouping and aggregation of data to facilitate queries of the database. Aggregation is ripe for optimization to further facilitate queries of databases. The demand for database volume and database speed continues to grow. As databases continue to grow in size they present numerous challenges related to quickly and efficiently performing real-time queries of terabytes (TBs) of data. Aggregation represents a large and important part of such queries.

As databases grow in size, modem hardware continues to grow more powerful and include increasingly more processors with multiple cores. For example, affordable computing devices include two to eight processors each having four to eight cores, each core having two or four hardware contexts. Each core includes one or two levels of primary caches and many processors include features which increase performance such as pipelining, instruction level parallelism, branch prediction and features for synchronization.

Conventional aggregation techniques struggle with challenges including synchronization, cache utilization, non-uniform access characteristics (NUMA), a plurality of database columns, data skew and operator selection of an optimal aggregation operator by an optimizer.

Aggregation is one of the most expensive relational database operators. Aggregation occurs in many analytical queries. The dominant cost of aggregation is, as with most relational operators, the movement of the data. In the days of disk-based database systems, relational operators were designed to reduce the number of I/Os needed to access the disk whereas access to main memory was considered free. In today's in-memory database systems, the challenge stays more or less the same but moves one level up in the memory hierarchy.

SUMMARY

One aspect of the presently described subject matter is directed to aggregating input into hashtables using just-in-time compilation of compilable code. Database records can received and can be stored in machine readable media. The one or more database records can form individual threads. Compilable code can be generated that is configured to cause the at least one programmable processor to produce one or more hashmaps. The one or more hashmaps can correspond to each individual thread from the input. The compilable code can be configured to cause the one or more processors to insert the hashmaps into a scheduler. The one or more hashmaps can each have at least one element having a hashkey with a first portion indicating a partition identity in which the element in the hashmap belongs.

Compilable code can be generated that is configured to aggregate elements from the one or more hashmaps into buckets of elements having the same partition identity. Compilable code can be generated that is configured to rehash the buckets of elements having the same partition identity to reduce the number of groups within the bucket. Compilable code can be generated that is configured to facilitate the merger of all non-empty elements from each target-partition into a merged-partition.

In some variations compilable code can be generated that is configured to cause the generation of a new partition in response to an indication that a partition having a particular identity is full.

The aggregation can comprise inserting elements having the same partition identity consecutively into the partition having that identity. The aggregation can comprise positioning the elements having the same partition identity at locations in the partition based on a second portion of the hashkeys associated with the elements indicating a partition location within the partition identified by the first portion of the hashkeys. In variations, responsive to a determination that the number of groups in the partition are too high, the aggregating can comprise positioning the elements having the same partition identity at locations in the partition based on additional portions of the hashkeys associated with the elements that indicate a partition location within the partition identified by earlier portions of the hashkeys.

A processing time can be determined for: inserting elements having the same partition identity consecutively into the partition having that identity, being a first routine; and, inserting elements having the same partition identity into the partition and position the elements into the partition based on a second portion of the hashkeys associated with the elements indicating a partition location within the partition identified by the first portion of the hashkeys, being a second routine. The faster of the first routine or the second routine can be selected and performed.

Code can be generated that is configured to cause the at least one programmable processor to generate the input where the compiling is performed at the time when the input is required.

Aggregating the elements into buckets can be performed within cache. The database can be stored in random-access-memory.

Compilable code, as herein described, can be generated in response to a query request and is optimized for a hardware configuration of the at least one programmable processor.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more technical advantages. For example, the presently disclosed subject matter provides a way to utilize the CPU cache more efficiently, to remove the bottleneck caused by accessing the much slower main-memory, or RAM. The presently disclosed subject matter provides an algorithm that requires a low number of accesses to the memory, independently of the number of threads used and independently of the data distribution. For example, 9 hashmaps may be initialized for 8 hardware threads. This facilitates lower memory consumption compared to other aggregation approaches. The presently disclosed algorithm causes a hashmap to be generated that includes an initial amount of partitions. A hashmap is allocated to one piece of memory including all its partitions. Additional partitions are allocated to individual pieces of memory. The partitions are sized such that a hashmap containing an initial amount of partitions fits into a beneficial cache layer, such as for example the per-thread-cache, or L2 cache. Accordingly the aggregation of the hashmaps can be performed within this cache layer, thereby providing an utmost cache efficient query of database records.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a particular software system architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 8 is an illustration of one example of algorithms that can be used during the processing of an input in accordance with one or more aspects of the present disclosure;

FIG. 9 is an illustration of one example of the algorithms that can be used to aggregate the partitions generated by the algorithms illustrated in FIG. 6, during the processing of an input in accordance with one or more aspects of the present disclosure;

Further features and advantages, as well as the structure and operation of various embodiments thereof, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

DETAILED DESCRIPTION

The presently disclosed subject matter provides a way to utilize the CPU cache more efficiently, to remove the bottleneck caused by accessing the much slower main-memory, or RAM. This can be accomplished through aggregation of the input to form hashmaps, which are themselves rehashed to reduce total number of groups that have to be processed at a given point of time. Aggregation can be accomplished through hashing and/or sorting. Aggregation by hashing inserts the input rows into a hash table, using the grouping attributes of each thread of the input as keys and aggregating the remaining attributes in-place. Aggregation by sorting first sorts the rows by the grouping attributes of each thread of the input and then aggregates the consecutive rows of each group.

Hashing allows for early aggregation of the rows of an input. If several rows of the group occur close to each other, hashing can aggregate those rows immediately into a single row. This reduces, early on in the aggregation, the amount of work that needs to be done, by, potentially, a very large factor. Where the input includes very few repeating keys, hashing can be ineffective because none, or very few, of the keys would align. Consequently, sorting the rows first without early aggregation can be faster. The presently disclosed subject matter contemplates an algorithm that can exploit the complementarity of hashing and sorting by effectively detecting locality during execution of the query and switching to whichever routine is faster.

Figure 1:
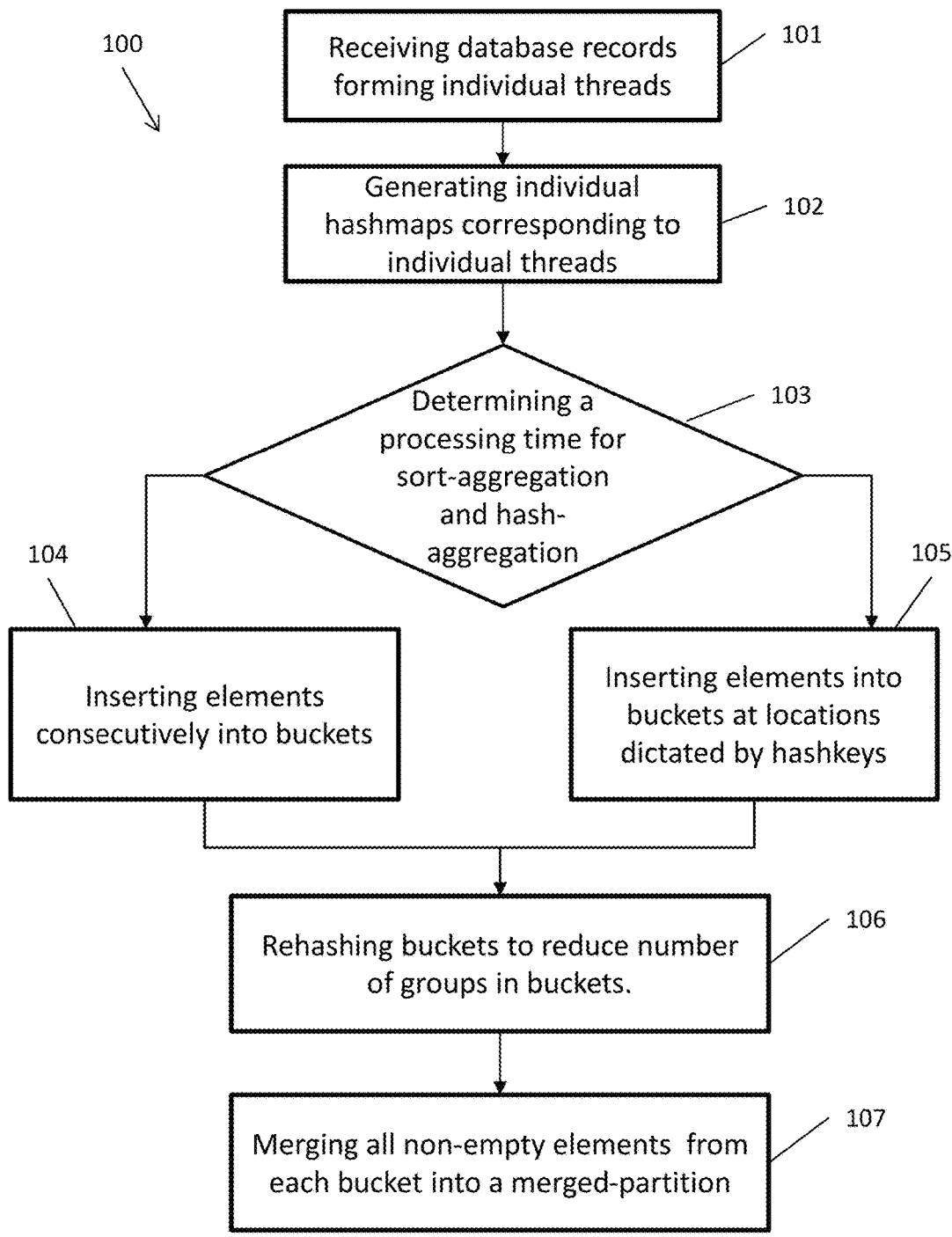
FIG. 1 illustrates an algorithm for aggregating data in a database according to one or more aspects of the presently disclosed subject matter.
Figure 13:
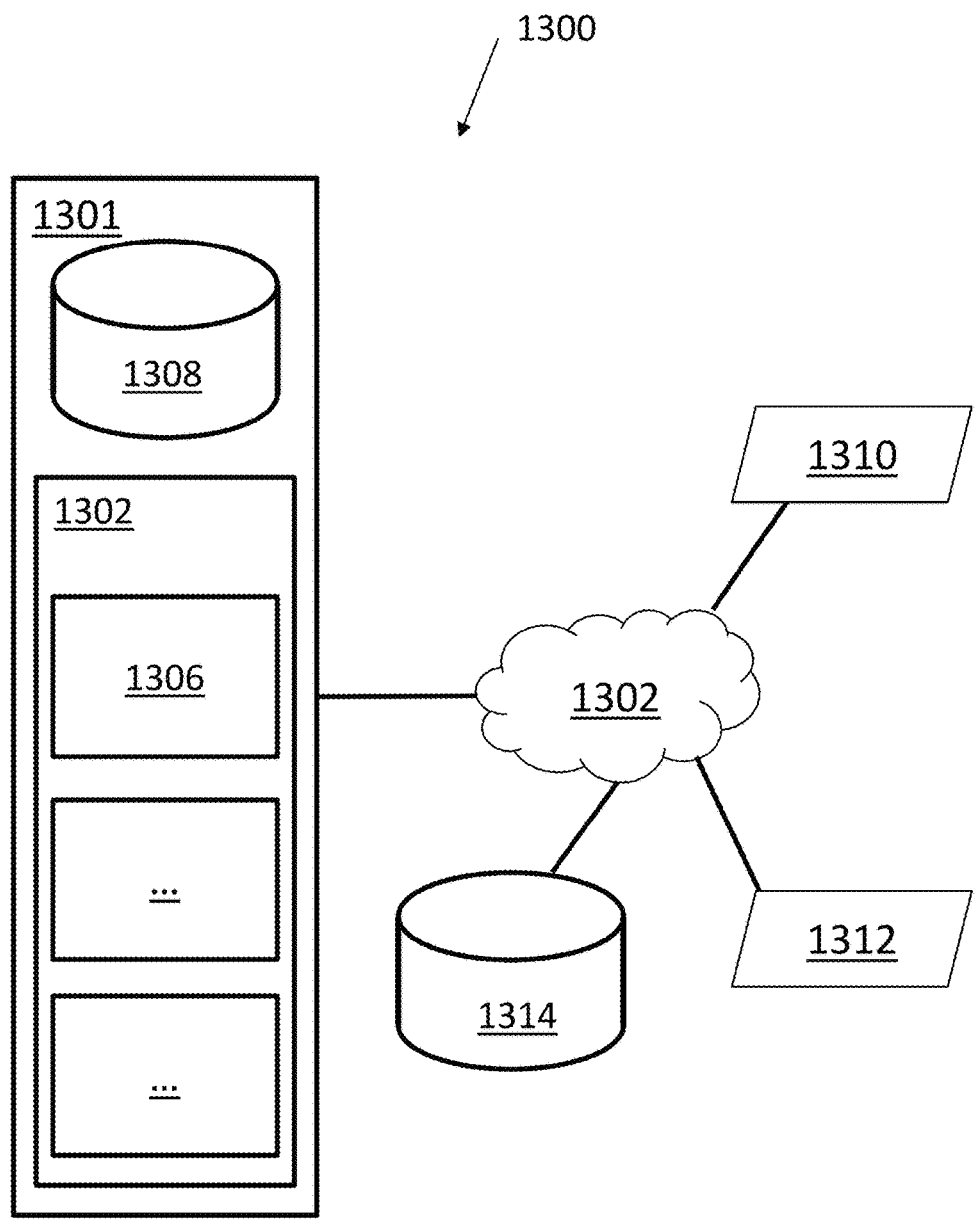
FIG. 13 is an illustration of a system for processing inputs from databases to facilitate querying the database, having one or more features consistent with aspects of the present disclosure.

FIG. 1 illustrates an algorithm 100 for aggregating data in a database according to one or more aspects of the presently disclosed subject matter. The operations of algorithm 100 can be performed by one or more processors, such as processor(s) 1302 as shown in FIG. 13.

At 101 an input can be received. The input can include records stored on machine-readable media. The input can include one or more database files having a plurality of records. The database records can include a plurality of columns and rows. The one or more records of the input can form individual threads.

In some implementations, at 101, code can be generated that is configured to cause the at least one programmable processor to generate the input. The code can be generated in response to a request to run a query. Additionally, the generated code may be compiled at a time when it is required. This may be referred to as just-in-time compilation.

A database system can receive queries from a client device. The received queries can be translated via multiple steps into an execution plan, containing execution operations, to provide results for the query back to the client. For individual execution operations the database system can generate compilable code. The compilable code may be compiled into machine code on a database server, client server, client device and/or other computing device. The compilable code can be optimized for the given hardware architecture of the computer system executing the machine code. During a query, the metadata associated with the database can be queried. Statistics and other information about the available data structure can be used from the physical layer to build a query plan to integrate different optimizations that are particular to both the database and the physical processor that is performing the query. The generated compilable code may facilitate use of all cores of a processor.

The compilable code can be custom-tailored for the given query. The database system can call the operations in an order given by the execution plan. In some variations, hash aggregation may be one such operation. Hash aggregation is one of the possible operations for handling grouping result tuples by multiple key columns.

Just-in-time compilation techniques can be used to generate compilable code that is configured to perform one or more of the operations described herein. For example, functions can be generated using just-in-time compilation techniques to generate compilable code configured to cause the computer system to perform the operations of a first pass, intermediate passes and ultimate pass of the hash aggregation described herein. In some variations there may be no passes and the just-in-time compilation techniques can be used to generate compilable code to perform one or more operations of the query. In some variations, the compilable code may be compiled into machine code by the client that requested the query, without additional interpretation costs in the runtime system of the database system. In variations, the compilable code may be C code. The C code may be further translated into other forms of code, such as virtual bytecode or any other form of code prior to being compiled.

A scheduler can schedule the execution of the operations facilitated by the compilable code such that the system performs one or more of the operations described herein.

Figure 2:
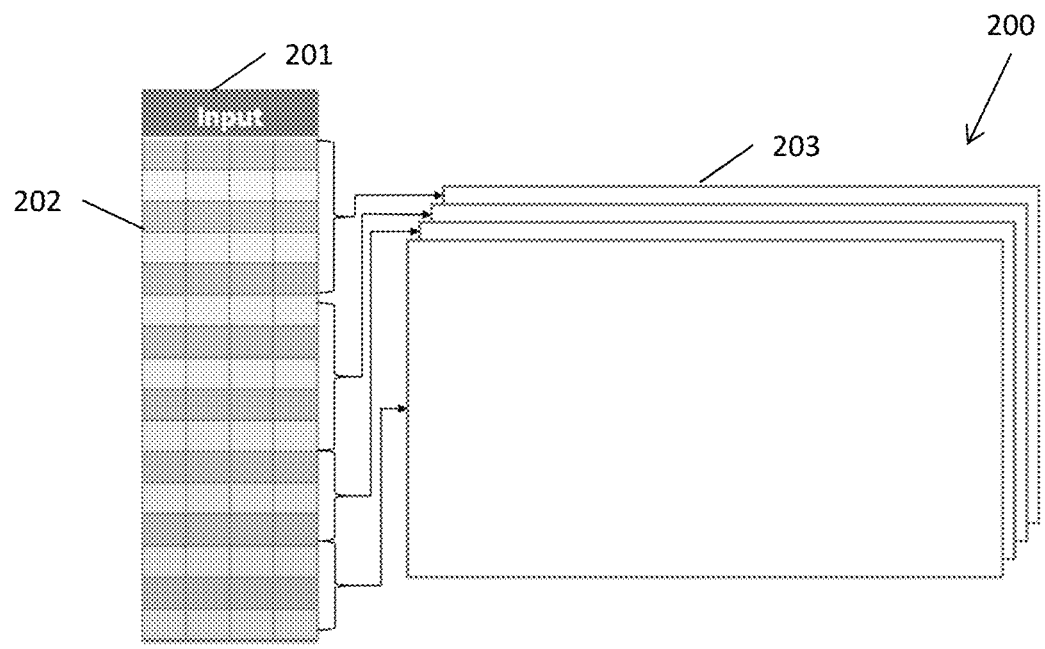
FIG. 2 is an illustration of an input for being processed in accordance with one or more aspects of the present disclosure.

At 102, individual hashmaps corresponding to individual threads of the input can be generated. FIG. 2 is an illustration 200 of an input 201 received by the system performing the algorithm according to one or more aspects of the present disclosure. The input 201 can include records that form threads 202. Each thread 202 inserts into its own hashmap 203.

Figure 3:
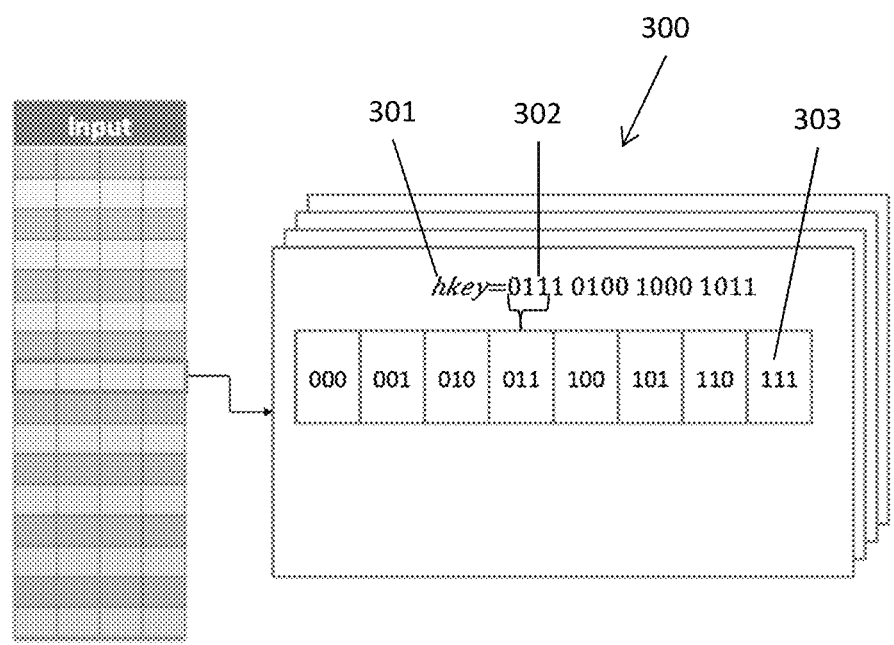
FIG. 3 is an illustration of a hashkey for an individual input thread that is being processed in accordance with one or more aspects of the present disclosure.

FIG. 3 is an illustration 300 of a hashkey 301 for an individual input thread. The first part 302 of the hashkey 301 of each input thread, or element, can provide an indication of the partition 303, or bucket, associated with the input element.

Figure 4:
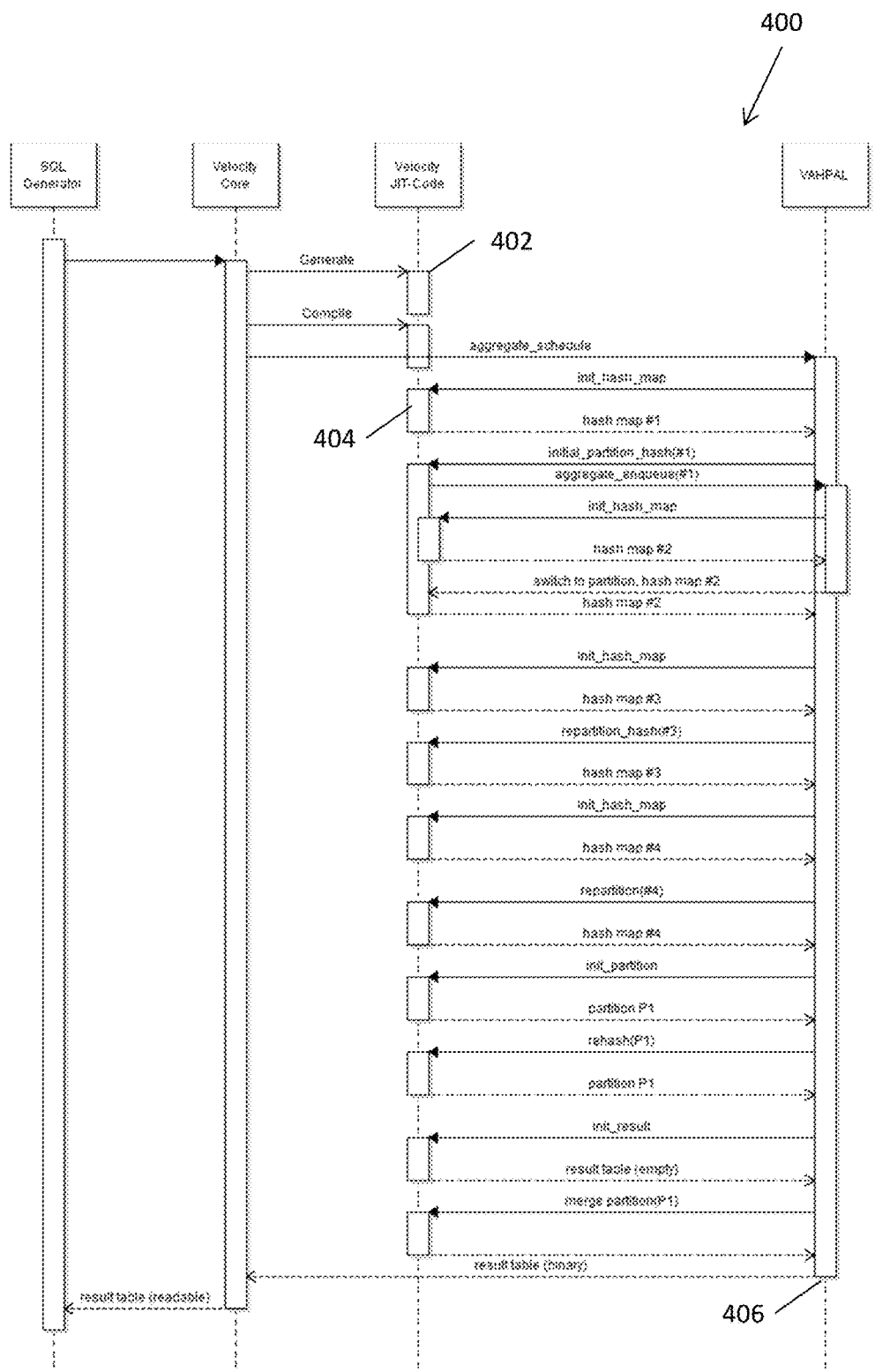
FIG. 4 is an illustration of an example process for generating compilable code in a system having one or more elements consistent with the presently described subject matter.

A database system performing such an operation can generate compilable code that is configured to cause the computer system, that executed the machine code derived from the compilable code, to consume the input data and produce hashmaps containing partitions. The code that is compiled to facilitate performance of these operations may be configured to be optimized for the hardware configuration of the computer system that is executing the machine code derived therefrom, and can be tailored to the particular query given. FIG. 4 is an illustration 400 of an example process for generating compilable code in a system having one or more elements consistent with the presently described subject matter. At 402 compilable code can be generated to consume the input data and produce hashmaps containing partitions. One of ordinary skill in the art would appreciate and understand that the presently described subject matter covers multiple different ways and types of execution and is not intended to be limiting by the example illustrated in FIG. 4.

Once the hashmaps have been generated, at 103 a determination of the processing time for sort-based aggregation of the generated hashmaps can be made. Similarly, at 103 a determination of the processing time for hash-based aggregation of the generated hashmaps can be made. Sort-based aggregation and hash-based aggregation have similar high-level structures—they recursively partition the input, either by the keys of the groups or by their hash values, until there are few enough groups left to process each partition in the cache.

Figure 5:
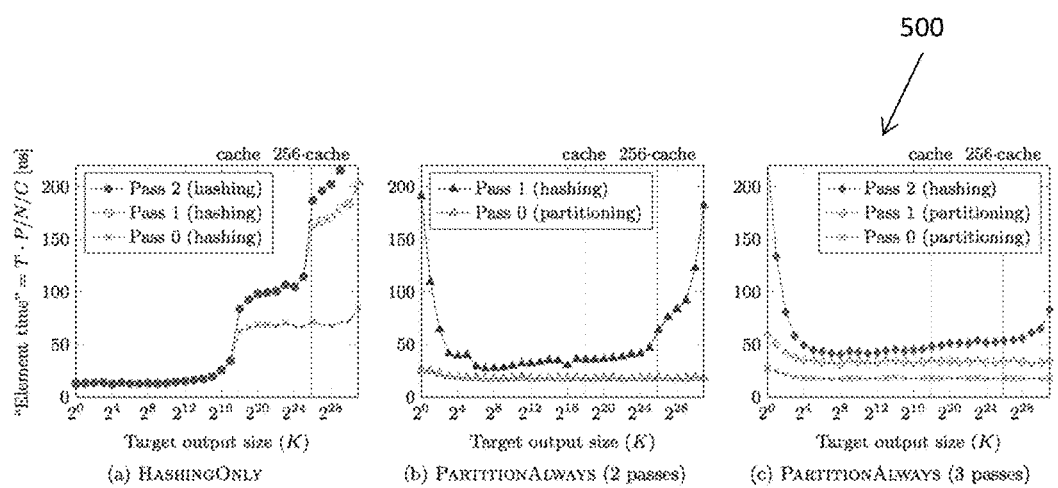
FIG. 5 illustrates results of experiments undertaken to determine when to switch between the hash-based algorithms and the sort-based algorithms, in accordance with one or more implementations of the present disclosure; and, FIG. 6 is an illustration of partitioning elements of the input without aggregation for an input being processed in accordance with one or more aspects of the present disclosure.

FIG. 5 illustrates results 500 of experiments undertaken to determine when to switch between the hash-based algorithms and the sort-based algorithms. FIG. 5a illustrates a scenario in which only hash-based algorithms are used. FIGS. 5b and 5c illustrate scenarios where the input is always preprocessed by one or more passes of the sort-based algorithm before a final hash-based algorithm is used to make a final pass.

Using only the hash-based algorithm, as shown in FIG. 5a, the hash-based algorithm automatically processes the correct number of passes, if the number of groups in the input is less than the cache size. This result is computed in the cache. When the number of groups in the input exceeds the cache size, the hash-based algorithm proceeds to recursively partition the input until the result is computed in cache and the recursion stops automatically. For partition-based algorithms there is no aggregation during partitioning. Consequently, the algorithm can only be used as preprocessing. External knowledge can be necessary to find the right depth of recursion before the final hash-based algorithm.

Another observation from the experiments is that partitioning is much faster than hashing if the number of groups exceeds the size of the cache. Hash-based algorithms suffer from non-sequential memory access and wasted space. This leads to wasted memory transfers intrinsic to hash tables. Once there are only slightly more groups than fit into one hash table it is unlikely that two elements with the same key will be found. As a result the amount of data is not reduced significantly. In contract, the partitioning-based, or sort-based algorithms achieve a high throughput, independently of the group size, based on hardware tuning.

In the case where there is uniformly distributed data, the partitioning routine can be used until the number of groups per partition is small enough that the hash-based algorithm(s) can process the rest of the input.

At 102, when the hash table gets full, the algorithm can determine the factor $\alpha := n_{in}/n_{out}$ by which the input run has been reduced, where $n_{in}$ is the number of processed rows and $n_{out}$ is the size of the hash table. If the number of groups exceeded a threshold, then using a hashing algorithm(s) can be the better choice as the input is reduced significantly. Consequently, in such a scenario, the algorithm continues with the hashing algorithm. Otherwise the algorithm can cause a switch from using the hashing algorithm(s) to using the partitioning algorithm(s). Several criteria are conceivable where it would make sense to switch back to hash-based algorithms after some time. The threshold number of groups for use with respect to partitioning algorithms, balances the performance penalty of hash-based algorithms compared to partitioning with its benefit of reducing the work of later passes.

Figure 6:
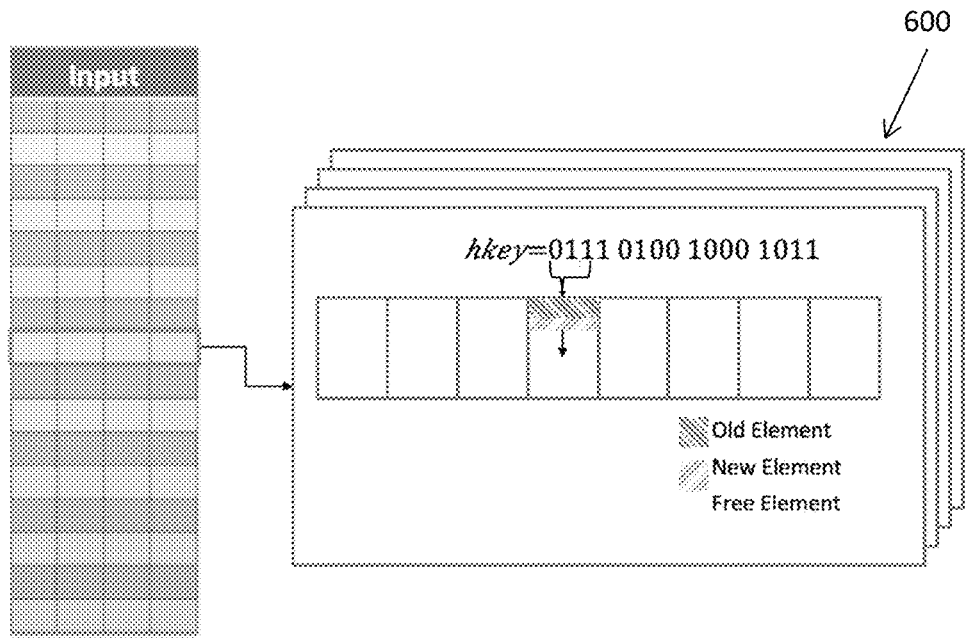

At 104, in response to a determination that hash-based aggregation has a lower processing time than sort-based aggregation, the elements of the hashmaps generated at 102 having an identity of a partition can be inserted into buckets having that same identity. FIG. 6 is an illustration 600 of the elements of the hashmaps inserted into buckets consecutively.

Figure 7:
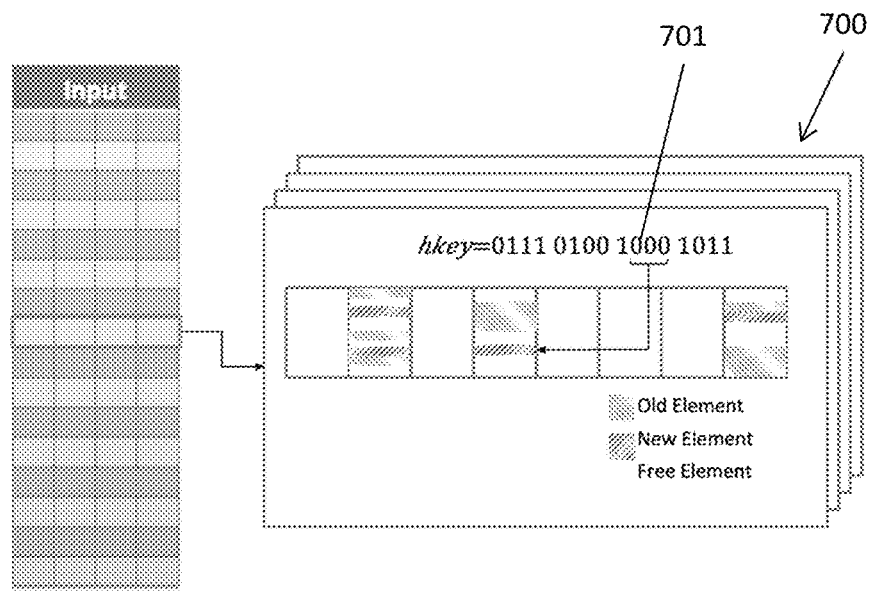
FIG. 7 is an illustration of partitioning elements of the input with aggregation for an input that is being processed in accordance with one or more aspects of the present disclosure.

At 105, in response to a determination that sort-based aggregation has a lower processing time than hash-based aggregation, the elements can be inserted into buckets. The bucket in which the elements are inserted can be based on at least a portion of the hashkey of the element. Another portion of the hashkey of the element can dictate a position in the bucket into which the element is inserted. FIG. 7 is an illustration of the elements of the hashmaps 700 inserted into a bucket at locations in the bucket dictated by a second portion 701 of the hashkeys associated with the elements. In some implementations, the last part of the hashkey can be used to determine the position of the element within the bucket.

FIG. 8 is an illustration 800 of one example of the kinds of algorithms that can be used to generate the partitions of the hashmaps. The partitions generated by such algorithms produce partitions in form of "runs." The PARTITIONING routine of the algorithm in FIG. 8 produces one run per partition by moving every row to its respective run. FIG. 6 illustrates an implementation of the PARTITIONING routine. The HASHING routine of the algorithm in FIG. 8 starts with a first hash table of the size of the cache and replaces its current hash table with a new one whenever it is full. FIG. 7 illustrates an implementation of the HASHING routine. Every full hash table can be split into one run per partition.

FIG. 9 is an illustration 900 of one example of the kinds of algorithms that can be used to aggregate the partitions generated by the algorithms illustrated in FIG. 7. The algorithms illustrated in FIG. 9 can include hash-based aggregation algorithms and sort-based aggregation algorithms.

In the algorithm shown in FIG. 9, the input is first split into runs. Then each run of the input is processed by one of the two routines selected by HashingOrPartitioning (line 6). An implementation of the HashingOrPartitioning routine is described with reference to the operations at 103 in FIG. 1. The routine can be selected, for example, at operation 103 in response to a determination of the most efficient routine between the two. Processing each run of the input by one of the two routines produces runs for the different buckets.

The system can toggle between the partitioning the hashmaps in accordance with the operations at 104 and partitioning in accordance with the operations at 105. The partition can toggle between partitioning routines based on the process time of each routine being applied to the input. A new partition can be created when a partition becomes full.

A database system can be configured to generate compilable code that is configured to facilitate the execution of one or more of the operations described herein. Partitions that have been previously stored in the scheduler can be consumed to produce hashmaps containing partitions which are reinserted into the scheduler. These hashmaps containing partitions which are reinserted into the scheduler may be consumed in a following pass. The compilable code may be configured to be optimized for the hardware of the computer system that is to execute the machine code derived therefrom. The compilable code may be tailored to the specific query requested. With reference to FIG. 4, at 404 compilable code can be generated that is configured to cause the at least one processor to consume the previously stored partitions to produce hashmaps containing partitions which are reinserted into the scheduler. The process at 404 may be recursively repeated, as shown in FIG. 4, until a single output is provided.

At 106, once at least a portion of the input has been processed at 104 and/or 105 into buckets, the buckets can be rehashed to reduce the number of groups in each of the individual buckets. In some implementations, the rehashing can occur after the entire input has been processed. The algorithm can treat all runs of the same partition as a single bucket and can recurse the elements into the buckets one after each other. With every step of the recursive partitioning, more and more hash digits are in common within a bucket, thus reducing the number of groups per bucket more and more. The recursion stops when there is a single run left for each bucket and in that run, all rows with of same group have been aggregated to a single output row.

Figure 10:
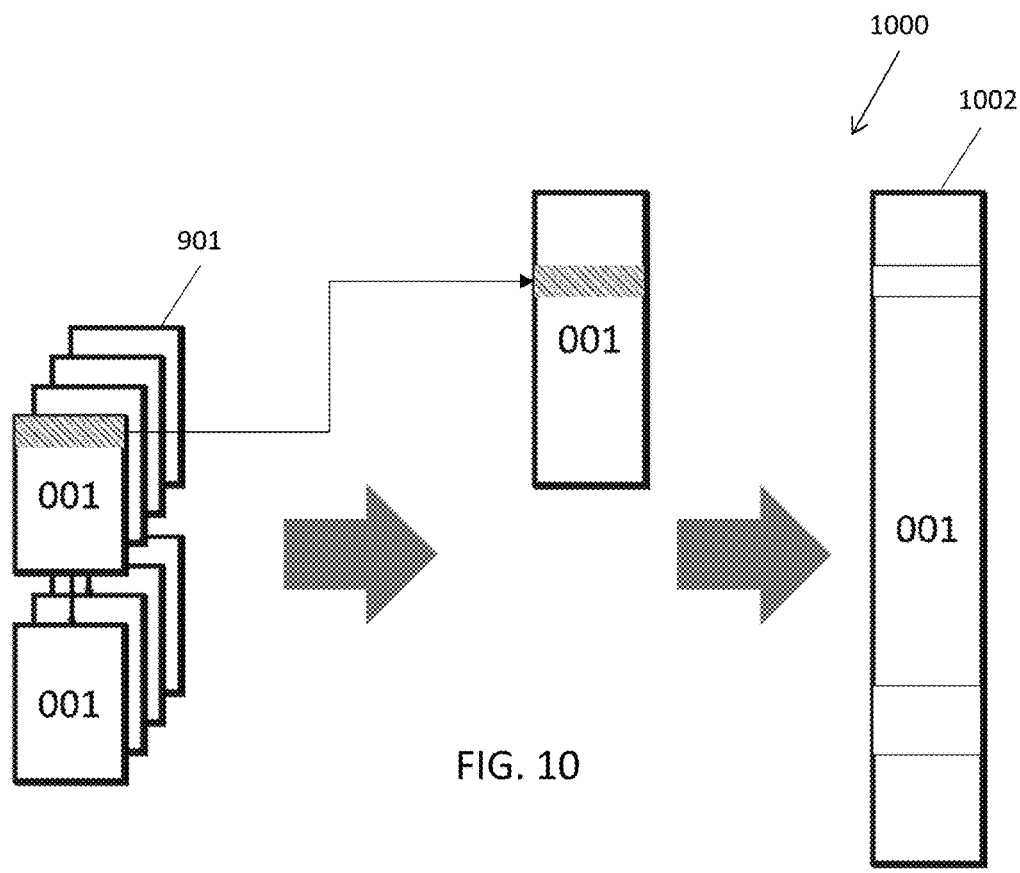
FIG. 10 is an illustration of rehashing the partitions, or buckets, into a single target-partition, during processing of an input in accordance with one or more aspects of the present disclosure.

FIG. 10 is an illustration 1000 of rehashing the partitions 1001, or buckets, into a single target-partition 1002.

A database system can be configured to generate compilable code that facilitates the consuming of partitions previously stored in the scheduler during prior passes. The generated compilable code can be configured to produce an output that can be consumed by following execution operations. In some variations the output can be a single output. Referring to FIG. 4, at 406 compilable code can be generated that is configured to facilitate an output that can be consumed by following execution operations.

Figure 11:
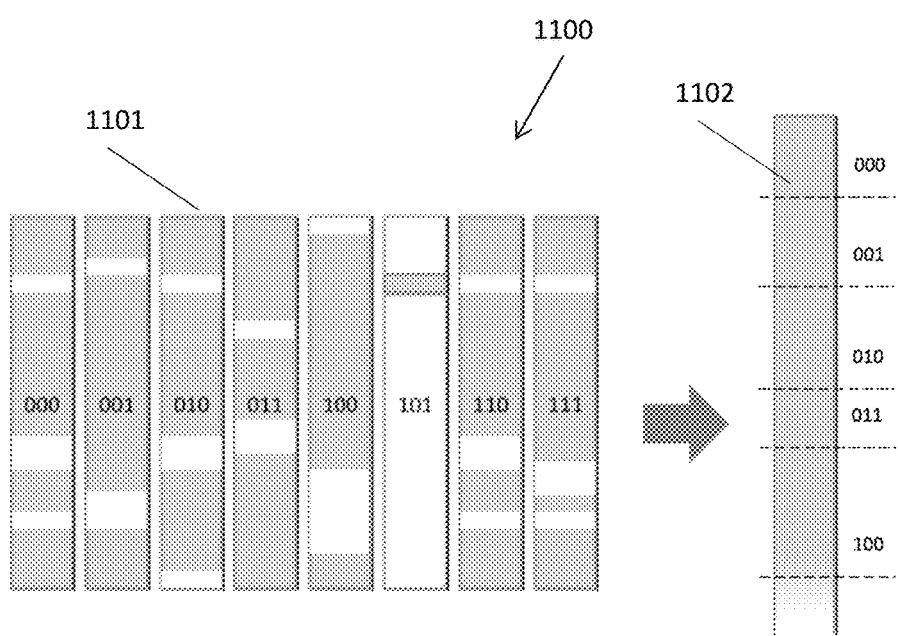
FIG. 11 is an illustration of merging the non-empty elements of the target-partitions into a merged-partition, during processing of an input in accordance with one or more aspects of the present disclosure.

At 107, all non-empty elements of the target-partition can be merged. Merging the non-empty elements of the target-partition can include merging individual target-partitions. FIG. 11 is an illustration 1100 of merging the non-empty elements of the target-partitions 1101 into merged-partition 1102. Merging of the target-partitions can be performed via generation of code to merge the target-partitions into merged-partitions. The code can be generated at the time that it is required. The code can be compiled at the time that it is required. The code can be compiled through just-in-time compilation.

Using the hash values as partition criterion has the advantage that it solves the problem of balancing the number of groups in the buckets: the hash function distributes the groups uniformly. Consequently the call tree of the algorithm is balanced.

The hash-based algorithm(s) used to hash the input has the advantage of enabling early aggregation of the input. Aggregation can be performed in all passes, not just the last. Since the hash-based algorithm(s) can aggregate rows from the same group, the resulting hash tables and hence the output runs are potentially much smaller than the input run, thus reducing the amount of data for subsequent passes by possibly large factors. In certain circumstances, partitioning can be tuned to have a greater throughput than hashing.

The presently disclosed subject matter supports hashing and partitioning of the input interchangeably allows the presently disclosed system switch to the better routine where appropriate. For example, in presence of locality, hash-based algorithms can be used, whose early aggregation reduces the amount of work for later passes. In absence of locality, partitioning can be utilized instead. The switching can happen spontaneously during run time, without losing work accomplished so far, and without coordination or planning. While the algorithm in FIG. 8 provides one method of switching between routines, other switching methods exist and are contemplated by the presently disclosed subject matter.

The mix of hashing and sorting can result in buckets that contain rows that were just copied from the input, and also rows that are already aggregates of several rows from the input. To properly aggregate two aggregated values, it is necessary to use a so-called super-aggregate function. A super-aggregate function is not always the same as the function that aggregates two values from the input. For example the super-aggregate function of COUNT is SUM. However it is easy to keep some meta-information associated with the intermediate runs indicating which aggregation function should be used.

The presently disclosed subject matter improves the use of the cache associated with the one or more physical computer processors. The presently disclosed subject matter allows for full parallelization of all phases of the algorithm. First, the main loop that partitions the input in Line 5 of Algorithm 2, shown in FIG. 9, can be executed in parallel without further synchronization since neither input nor output are shared among the threads. Second, the recursive calls on the different buckets in Line 8 of Algorithm 2, shown in FIG. 9, can also be done in parallel. Only the management of the runs between the recursive calls require synchronization, but this happens infrequently enough to be negligible.

In some implementations, parallel tasks for the recursive calls are created. The recursive calls are completely independent of each other. Work-stealing can be used to parallelize the loop over the input. By using work-stealing, the creation of additional work is limited to situations where no other form of parallelism is available. In particular, parallelizing the main loop is needed in the following two cases: First it is the only way to parallelize the initial call of the algorithm and second it allows for full parallelization even in presence of skew: the buckets after the first call can be of arbitrarily different sizes because even an ideal hash function only distributes the groups evenly over the buckets, but does not affect the distribution of rows into these groups (which is given by the input). With work-stealing in the main loop however, the threads can be scheduled to help with the large buckets once they have finished their own recursive call.

Modern analytical database systems often use a column store architecture. In the column store architecture, the question arises when and how the aggregate columns should be processed with respect to the grouping columns.

One example for column-wise processing is to process all columns at the same time, similarly to a row store. An aggregation operator would read the values of a single row from one column after another, compute the aggregates, and then store them in their respective result columns one after each other.

Figure 12:
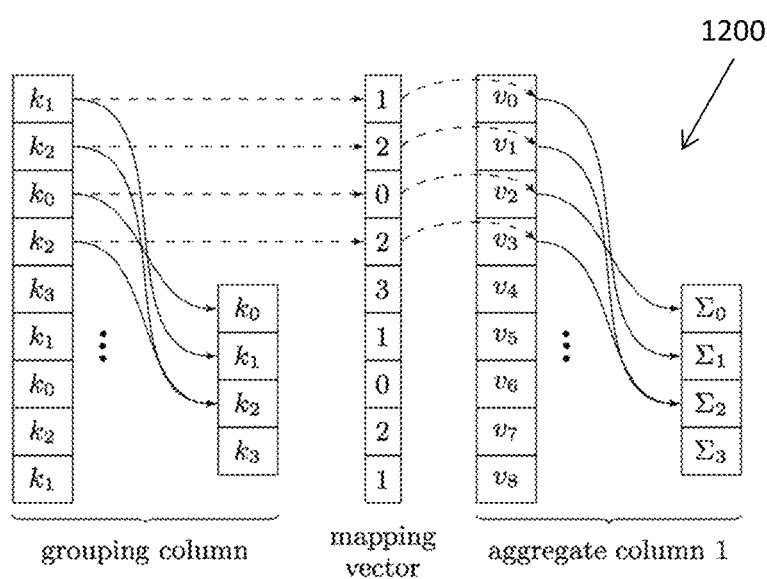
FIG. 12 is an illustration of processing one column in a database record at a time.

Another example for column-wise processing is to do the processing one column at a time. With this approach, aggregation is split into two operators as illustrated by FIG. 12. FIG. 12 is an illustration 1200 of processing one column in a database record at a time. The first operator can process the grouping column and produce a vector with identifiers of the groups and a mapping vector. This maps every input row to the index of its group. The second operator can apply this mapping vector by aggregating every input value with the current aggregate of the group as indicated by the mapping vector and is executed once for each aggregate column. This approach can require additional memory access to write and read the mapping vector. If the input values are aggregated directly to their group in the output column, the same sub-optimal memory access pattern as provided by hash-based aggregation, are observed, producing close to a cache miss for every input row for large outputs. Since there are often many more aggregate columns than grouping columns, this would impact performance in the processing of hash-keys.

In some variations, the different columns can be processed into blocks, the blocks having a complimentary size to the cache. When aggregated, the columns can be processed in tight loops without materialization of the mapping vector to memory.

In other variations, the different columns can be processed by producing a run of the grouping column. The run can use one of, or both of the hashing-based algorithm and the partitioning-based algorithm. This process run can produce a mapping vector as depicted in FIG. 12, but only for this particular run. Subsequently, this mapping is then applied to the corresponding parts of the aggregate columns. When the corresponding runs of all columns have been produced, the framework continues with the processing of the rest of the input.

The presently disclosed subject matter contemplates replacing parts of the query processing by just-in-time compilation and execution. Just-in-time compilation can require that pipelines of the execution plan of a query is compiled into a fragment of machine code immediately prior to execution. This enables processing in tight loops without decoupling the processing of different columns. The fragments of machine code can include both the portioning routine and the hashing routine.

Example ways that the presently disclosed algorithm can operate on computer hardware is provided in U.S. application Ser. No. 13/729,111, filed Dec. 28, 2012 and published as U.S. Publication No. 2014/0188906 A1, the disclosure of which is incorporated herein in its entirety.

Further, FIG. 13 is an illustration of a system 1300 for processing inputs from databases to facilitate querying the database. The system 1300 can comprise one or more physical processors 1302. The system 1300 can include communication lines between various elements of the system 1300 to enable the exchange of information with a network and/or other computing platforms. Such communication lines can include a network 1302. The network 1302 can be, for example, the Internet, a Virtual Private Network, a wireless network, a wired network, a Local Area Network, a Wide Area Network, a peer-to-peer connection and/or other communication lines.

The processors 1302 can be configured to execute computer program instructions. The computer program instructions can be configured to cause the processor(s) 1302 to perform the operations herein disclosed. The processors 1302 can be configured to execute the computer program instructions 1306 via one or more of hardware, software, and/or firmware. The computer program instructions 1306 can be stored on processor(s) 1302, in one or more electronic storage locations adjacent or proximate to processor(s)

1302, in electronic storage 1308, and/or other locations. In some implementations, the computer program instructions 1306 can be located in one or more remote computing devices 1310. The remote computing devices 1310 can belong to clients. The remote computing devices can be configured to communicate with the server 1301.

Although system 1302 can be described in certain sections herein as including a server 1301, this is not intended to be limiting. The functionality attributable to server 1301 can be attributable to multiple servers and/or other components of system 1300. For example, some of the functionality herein described can be performed by remote computing devices 1310, third-party computing devices 1312, third-party electronic storage providers 1314, and/or other computer devices.

A given remote computing device 1310 can include one or more processors configured to execute computer program instructions. The computer program instructions can be configured to enable an expert or user associated with the given remote computing device 1302 to interface with system 1300 and/or external resources 1312, third-party storage devices 1314, and/or provide other functionality attributed herein to remote computing device 1310. By way of non-limiting example, the given remote computing platform 1310 can include one or more of a desktop computer, a laptop computer, a handheld computer, a tablet computing device, a NetBook, a Smartphone, a gaming console, a client-side server and/or other computing devises.

In some implementations databases can be stored in electronic storage media 1308 associated with server 1301. The server 1301 can be provided and/or maintained by a database storage provider. Queries executed by users on remote computing devices 1310 can be transmitted, over a network 1302, to server(s) 1301 for running of the query on a database stored in electronic storage media 1308. Alternatively, queries executed by users on remote computing devices 1310 can be run on the remote computing devices 1310 on a database(s) stored in electronic storage media 1208. In yet another alternative, queries executed by users on remote computing devices 1310 can be partially performed on server 1301 and on remote computing devices 1310.

In some implementations, databases can be stored on electronic storage media associated with remote computing devices 1310. Such systems can be stand-alone systems with no external communication network. In some variations, such systems can include a communication link, such as a network 1302, providing communication capabilities between the remote computing device(s) 1310 and the server 1301. The server 1301 can be configured to monitor performance of the remote computing device(s) 1310 and provide support where necessary. Such support can be in the form of increased processing capabilities, coordinating the increase of processing capabilities, providing code generation capabilities, remote support capabilities and/or other capabilities.

The processor(s) 1302 can be configured to execute computer program instructions, such as computer program instructions 1306. Computer program instructions 1306 are represented here as discrete blocks within processor 1306, but this is not intended to be limiting. The discrete blocks for computer program instructions 1306 is provided in FIG. 1 for ease of representation only, and the present disclosure contemplates any format or arrangement of computer program instructions 1306. The functionality described herein can be provided by discrete computer program modules and/or components, or can be provided by continuous uninterrupted code, or by any other arrangement of computer program instructions. The computer program instructions 1306 can be stored in electronic storage media. The computer program instructions 1306 can be stored in electronic storage media 1308 associated with server 1301 in which at least one or more of the processors 1302 reside. The computer program instructions 1306 can be stored in external storage 1314.

Database information can be stored in electronic storage. Database information can be stored in electronic storage media 1308, external electronic storage 1#14, and/or other electronic storage.

Electronic storage 1304 and/or electronic storage 1314 can comprise electronic storage media that electronically stores information. The electronic storage media of electronic storage 1304 and/or 1314 can include one or both of system storage that is provided integrally (i.e., substantially non-removable) with server 1301 and/or removable storage that is removably connectable to server 1301 via, for example, a port (e.g., a USB port, a firewire port, etc.) or a drive (e.g., a disk drive, etc.). Electronic storage 1#04 and 1#14 can be associated with remote computing devices 1310. Electronic storage 1#04/1314 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 1#04/1314 can include one or more virtual storage resources (e.g., cloud storage, a virtual private network, and/or other virtual storage resources). Electronic storage 1304/1314 can store software algorithms, information determined by processor 1302, information received from server 1301, information received from remote computing devices 1310, information received from external resources 1312 and/or other information that enables server 1301 to function as described herein.

Processor(s) 1302 is configured to provide information processing capabilities in system 1300. As such, processor 1302 can include one or more of a digital processor, an analog processor, a digital circuit designed to process information, an analog circuit designed to process information, a state machine, and/or other mechanisms for electronically processing information. Although processor 1302 is shown in FIG. 13 as a single entity, this is for illustrative purposes only. In some implementations, processor 1302 can include a plurality of processing units. These processing units can be physically located within the same device, or processor 1302 can represent processing functionality of a plurality of devices operating in coordination.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by at least one programmable processor forming at least one computing device, the method comprising:

receiving, by the at least one processor, database records stored in machine readable media, the one or more database records forming individual threads;

generating, by the at least one processor, compilable code configured to cause the at least one programmable processor to produce one or more hashmaps that correspond to each individual thread from the input and insert the one or more hashmaps into a scheduler, the one or more hashmaps each having at least one element having a hashkey with a first portion indicating a partition identity in which the element in the hashmap belongs;

determining, by the at least one processor, a first processing time for aggregating elements from the one or more hashmaps according to a first aggregation method;

determining, by the at least one processor, a second processing time for aggregating the elements from the one or more hashmaps according to a second aggregation method;

selecting, by the at least one processor, one of the first aggregation method and the second aggregation method based on a comparison of the first processing time with the second processing time;

generating, by the at least one processer and based on the selecting, compilable code configured to aggregate elements from the one or more hashmaps into buckets of elements having the same partition identity;

generating, by the at least one processor, compilable code to rehash the buckets of elements having the same partition identity to reduce the number of groups within the bucket; and, generating, by the at least one processor, compilable code to merge all non-empty elements from each target-partition into a merged-partition.

2. The method as in claim 1, wherein partitions have a finite size and the method further comprises:

generating, by the at least one processor, compilable code configured to cause the generation of a new partition in response to an indication that a partition having a particular identity is full.

3. The method as in claim 1, wherein the aggregating comprises inserting elements having the same partition identity consecutively into the partition having that identity.

4. The method as in claim 1, wherein the aggregating comprises positioning the elements having the same partition identity at locations in the partition based on a second portion of the hashkeys associated with the elements indicating a partition location within the partition identified by the first portion of the hashkeys.

5. The method as in claim 4, wherein, responsive to a determination that the number of groups in the partition are too high, the aggregating comprises positioning the elements having the same partition identity at locations in the partition based on additional portions of the hashkeys associated with the elements that indicate a partition location within the partition identified by earlier portions of the hashkeys.

6. The method as in claim 1, wherein the first aggregation method comprises a sort-based aggregation, wherein the second aggregation method comprises a hash-based aggregation, wherein the selecting comprises selecting the one of the first aggregation method and the second aggregation method with the shorter processing time, the method further comprising:
performing the selected aggregation method.

7. The method of claim 1, further comprising:
generating code that is configured to cause the at least one programmable processor to generate the input; and,
compiling the generated code at the time when the input is required, to generate the input.

8. The method as in claim 1, wherein aggregating the elements into buckets is performed within cache.

9. The method as in claim 1, wherein the database is stored in random-access-memory.

10. The method of claim 1, wherein the compilable code is generated in response to a query request and is optimized for a hardware configuration of the at least one programmable processor.

11. A system comprising at least one programmable computer processor configured by machine-readable instructions to:
receive database records stored in machine readable media, the one or more database records forming individual threads;
generate compilable code configured to cause the at least one programmable processor to produce one or more hashmaps that correspond to each individual thread from the input and insert the one or more hashmaps into a scheduler, the one or more hashmaps each having at least one element having a hashkey with a first portion indicating a partition identity in which the element in the hashmap belongs;
determine a first processing time for aggregating elements from the one or more hashmaps according to a first aggregation method;
determine a second processing time for aggregating the elements from the one or more hashmaps according to a second aggregation method;
select one of the first aggregation method and the second aggregation method based on a comparison of the first processing time with the second processing time;
generate, based on the selecting, compilable code configured to aggregate elements from the one or more hashmaps into buckets of elements having the same partition identity;
generate compilable code to rehash the buckets of elements having the same partition identity to reduce the number of groups within the bucket; and,
generate compilable code to merge all non-empty elements from each target-partition into a merged-partition.

12. The system as in claim 11, wherein partitions have a finite size and the at least one programmable computer processor is configured by machine-readable instructions to:
generate compilable code configured to cause the generation of a new partition in response to an indication that a partition having a particular identity is full.

13. The system as in claim 11, wherein the aggregating comprises inserting elements having the same partition identity consecutively into the partition having that identity.

14. The system as in claim 11, wherein the aggregating comprises positioning the elements having the same partition identity at locations in the partition based on a second portion of the hashkeys associated with the elements indicating a partition location within the partition identified by the first portion of the hashkeys.

15. The system as in claim 14, wherein, responsive to a determination that the number of groups in the partition are too high, the aggregating comprises positioning the elements having the same partition identity at locations in the partition based on additional portions of the hashkeys associated with the elements that indicate a partition location within the partition identified by earlier portions of the hashkeys.

16. The system as in claim 11, wherein the first aggregation method comprises a sort-based aggregation, wherein the second aggregation method comprises a hash-based aggregation, at least one programmable computer processor is configured by machine-readable instructions to:
select the one of the first aggregation method and the second aggregation method with the shorter processing time; and,
performing the selected aggregation method.

17. The system of claim 11, wherein the at least one programmable computer processor is configured by machine-readable instructions to:
generate code that is configured to cause the at least one programmable computer processor to generate the input; and,
compile the generated code at the time when the input is required, to generate the input.

18. The system of claim 11, wherein the compilable code is generated in response to a query request and is optimized for a hardware configuration of the at least one programmable processor.

19. A computer program product comprising a non-transitory machine-readable medium storing instructions that, when executed by at least one programmable processor, cause the at least one programmable processor to perform operations comprising:
receiving, by the at least one processor, database records stored in machine readable media, the one or more database records forming individual threads;
generating, by the at least one processor, compilable code configured to cause the at least one programmable processor to produce one or more hashmaps that correspond to each individual thread from the input and insert the one or more hashmaps into a scheduler, the one or more hashmaps each having at least one element having a hashkey with a first portion indicating a partition identity in which the element in the hashmap belongs;
determining, by the at least one processor, a first processing time for aggregating elements from the one or more hashmaps according to a first aggregation method;

determining, by the at least one processor, a second processing time for aggregating the elements from the one or more hashmaps according to a second aggregation method;

selecting, by the at least one processor, one of the first aggregation method and the second aggregation method based on a comparison of the first processing time with the second processing time;

generating, by the at least one processer and based on the selecting, compilable code configured to aggregate elements from the one or more hashmaps into buckets of elements having the same partition identity;

generating, by the at least one processor, compilable code to rehash the buckets of elements having the same partition identity to reduce the number of groups within the bucket; and, generating, by the at least one processor, compilable code to merge all non-empty elements from each target-partition into a merged-partition.

20. The computer program produce of claim 19, wherein the operations further comprise:

generating code that is configured to cause the at least one programmable processor to generate the input; and, compiling the generated code at the time when the input is required, to generate the input.

* * * * *